(12) United States Patent
Chuang et al.

(10) Patent No.: US 7,776,424 B2
(45) Date of Patent: Aug. 17, 2010

(54) OPTICAL SHEET

(75) Inventors: Shih-Yi Chuang, Kaohsiung (CN);
Chao-Yi Tsai, Kaohsiung (CN)

(73) Assignee: Eternal Chemical Co., Ltd., Kaohsiung (TW)

( * ) Notice: Subject to any disclaimer, the term of this patent is extended or adjusted under 35 U.S.C. 154(b) by 0 days.

(21) Appl. No.: 11/601,319

(22) Filed: Nov. 16, 2006

(65) Prior Publication Data

US 2007/0128413 A1    Jun. 7, 2007

(30) Foreign Application Priority Data

Dec. 7, 2005    (TW) ............................... 94221278 U

(51) Int. Cl.
| | |
|---|---|
| B32B 3/00 | (2006.01) |
| B32B 3/28 | (2006.01) |
| B32B 3/30 | (2006.01) |
| F21V 5/02 | (2006.01) |
| G02B 5/02 | (2006.01) |
| G02B 13/20 | (2006.01) |

(52) U.S. Cl. ....................... 428/172; 428/156; 428/167; 428/141; 359/599; 362/339

(58) Field of Classification Search ................. 428/156, 428/167, 141, 304.4, 315.9, 172; 362/339; 359/599

See application file for complete search history.

(56) References Cited

U.S. PATENT DOCUMENTS

| 5,852,514 | A | * | 12/1998 | Toshima et al. | ............... | 359/599 |
| 6,002,464 | A | * | 12/1999 | Fujisawa et al. | ............ | 349/112 |
| 6,259,496 | B1 | * | 7/2001 | Kashima | ...................... | 349/62 |
| 6,790,914 | B2 | * | 9/2004 | Kanamori et al. | ........ | 525/326.5 |
| 7,074,463 | B2 | * | 7/2006 | Jones et al. | ................... | 428/1.1 |
| 2005/0007000 | A1 | * | 1/2005 | Chou et al. | .................. | 313/116 |

FOREIGN PATENT DOCUMENTS

JP         2002116306  A  *  4/2002

* cited by examiner

Primary Examiner—David R Sample
Assistant Examiner—Catherine Simone
(74) Attorney, Agent, or Firm—Townsend and Townsend and Crew, LLP

(57) ABSTRACT

An optical sheet includes a substrate, a light diffusion layer formed on the substrate, and a light gathering layer formed on the light diffusion layer. The light diffusion layer includes a polymeric resin having a plurality of bubbles mixed therein. The light gathering layer has at least one microstructure. The optical sheet of the subject invention can be used in LCD's as a photo-diffusive brightness enhancement film.

11 Claims, 7 Drawing Sheets

OPTICAL SHEET

BACKGROUND OF THE INVENTION

1. Field of the Invention

This invention relates to an optical sheet, more particularly to an optical sheet including a light diffusion layer that includes a polymeric resin having bubbles mixed therein.

2. Description of the Related Art

Many approaches have been proposed to increase the range of viewing angles or brightness of a liquid crystal display (LCD). For example, it has been attempted to increase the number of lamps in the light source of the LCD so as to enhance brightness of a display panel of the LCD. However, an increase in the number of lamps will cause a waste of energy and generate a considerable amount of heat. The generated heat will accumulate inside the LCD, thereby deteriorating electronic components in the LCD and shortening the service life of the LCD.

Recently, the brightness of a display panel of the LCD can be enhanced using a brightness enhancement film or a prism film.

The brightness enhancement film traditionally can be manufactured by applying a layer of curable resin, such as acrylic resin, on a polyester substrate, and then patterning the layer of curable resin through imprinting or irradiating with a UV light so as to form microstructures on a surface of the layer of curable resin.

WO 96/23649 discloses an improved method for making a brightness enhancement film. Referring to FIG. 1, the brightness enhancement film 1 obtained from WO 96/23649 includes a substrate 11 and a layer of oligomeric resin 12 formed on the substrate 11. The substrate 11 has a smooth surface 111 opposite to the layer of oligomeric resin 12. The layer of oligomeric resin 12 is formed with a microstructure in the form of prisms 121. Subsequently, the microstructure is subjected to heat treatment so as to reduce deformation thereof.

Although the brightness of the display panel of the LCD can be enhanced using a brightness enhancement film, uneven light beams through the display panel remains a problem. Hence, there is a need in the art to provide a dual-function optical sheet which can enhance the brightness as well as the uniformity of light through the display panel.

SUMMARY OF THE INVENTION

Therefore, the object of the present invention is to provide an optical sheet that includes a light diffusion layer and a light gathering layer so as to enhance the brightness as well as the uniformity of light when applied to LCDs as a photo-diffusive brightness enhancement film.

According to this invention, an optical sheet includes: a substrate; a light diffusion layer formed on the substrate, and including a polymeric resin having bubbles mixed therein; and a light gathering layer formed on the light diffusion layer, and having at least one microstructure.

BRIEF DESCRIPTION OF THE DRAWINGS

Other features and advantages of the present invention will become apparent in the following detailed description of the preferred embodiment of this invention, with reference to the accompanying drawings, in which.

DETAILED DESCRIPTION OF THE PREFERRED EMBODIMENT

Figure 1:
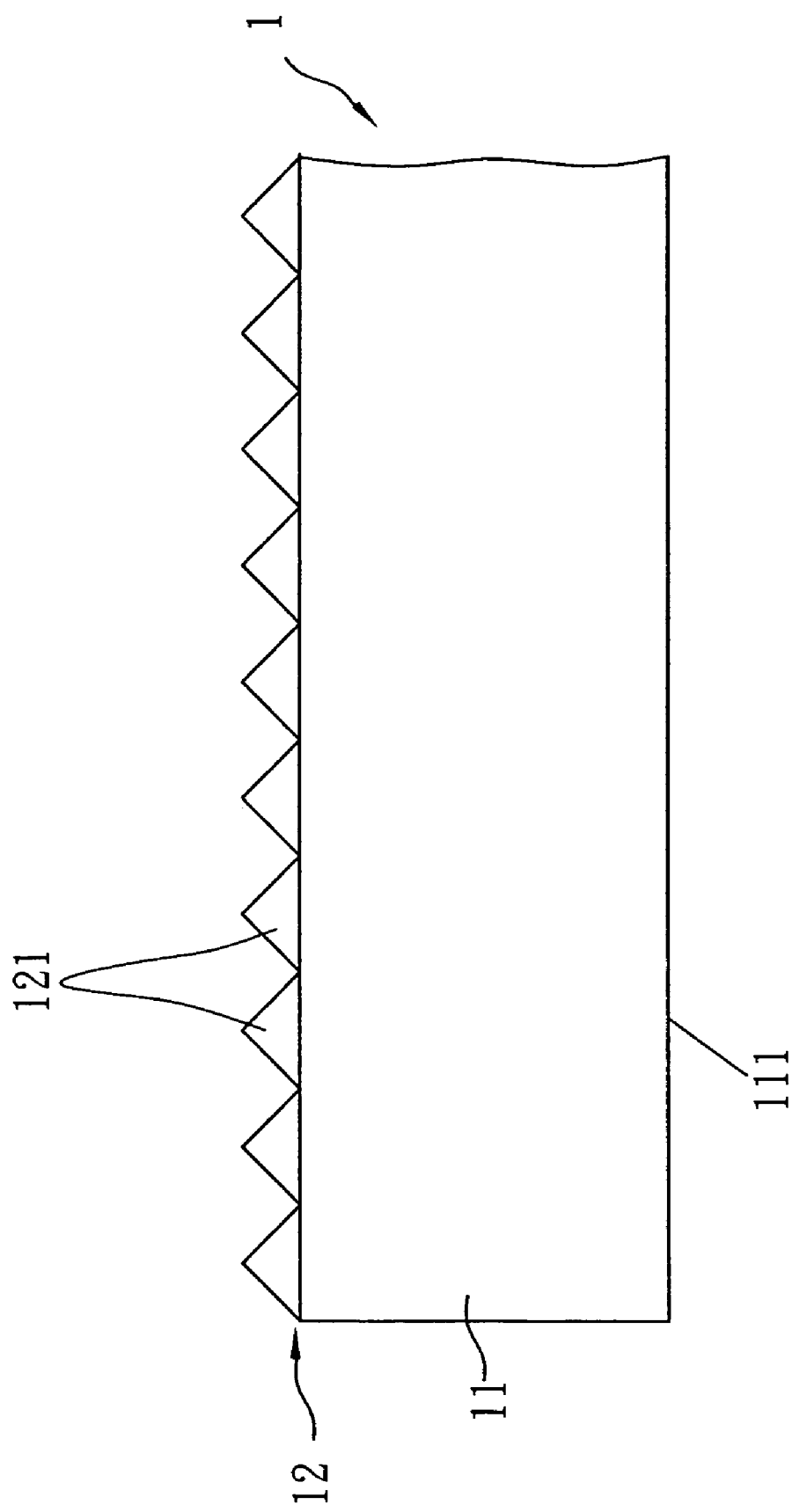
FIG. 1 is a fragmentary side view to illustrate a conventional optical sheet.
Figure 2:
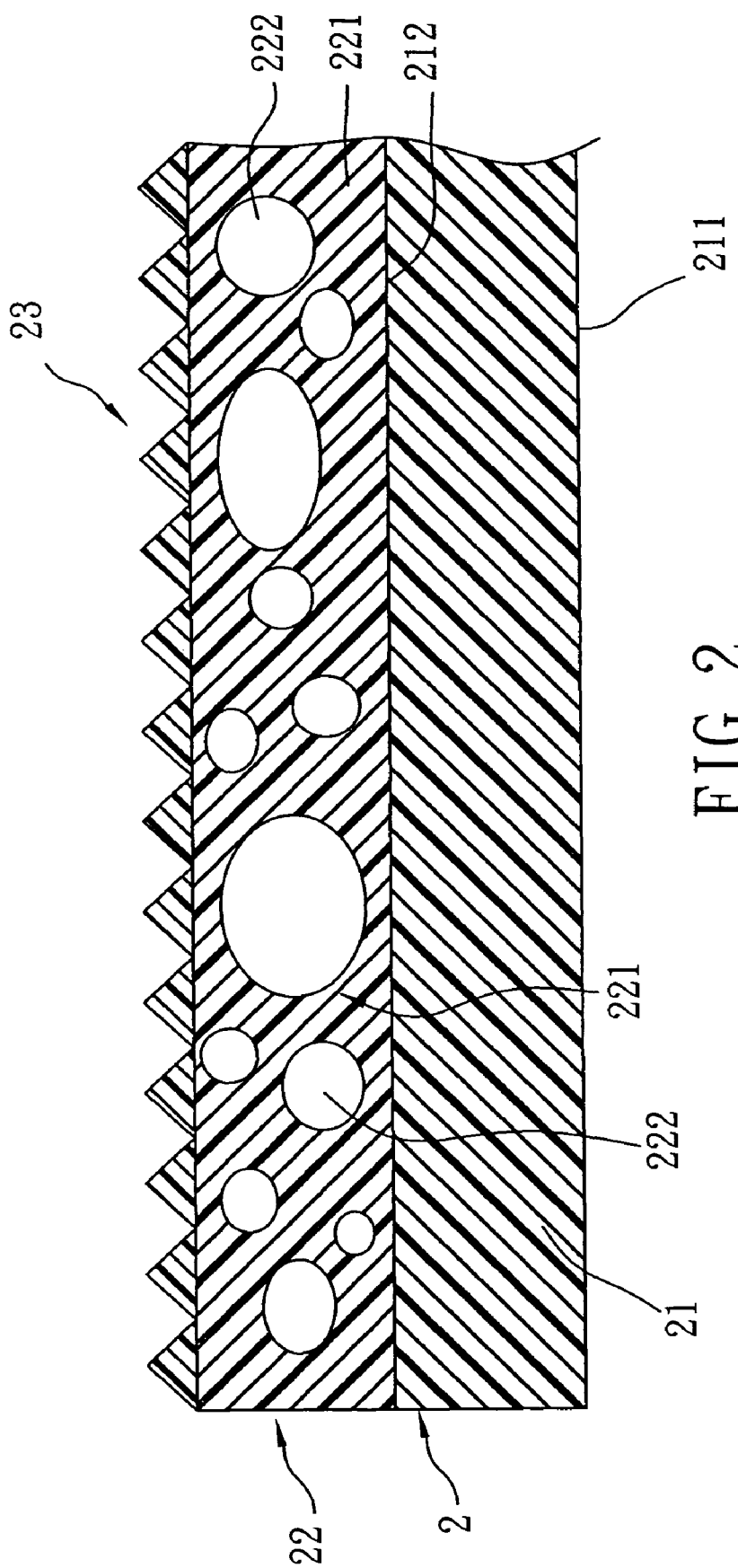
FIG. 2 is a fragmentary sectional view to illustrate the preferred embodiment of an optical sheet according to the present invention.
Figure 3:
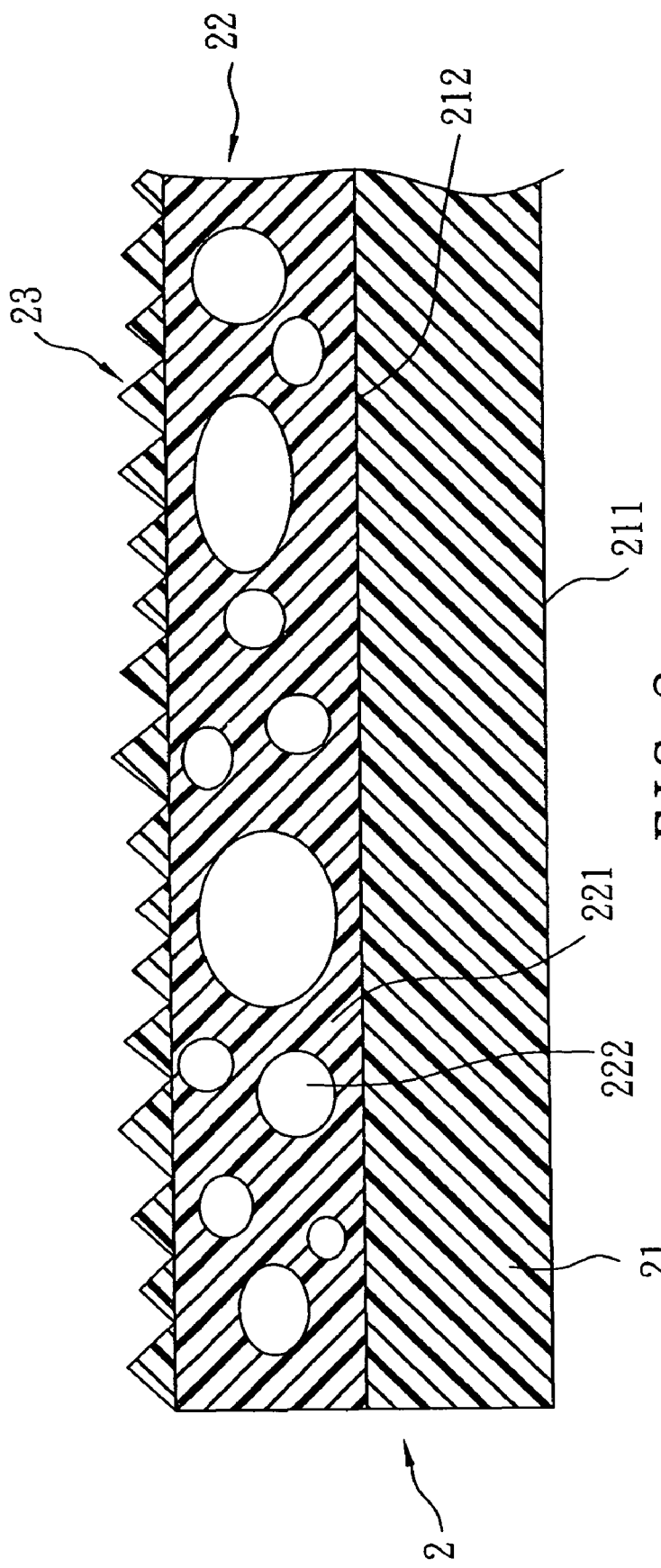
FIGS. 3 to 7 are fragmentary sectional views to illustrate various structural modifications of the preferred embodiment of FIG. 2.
Figure 4:
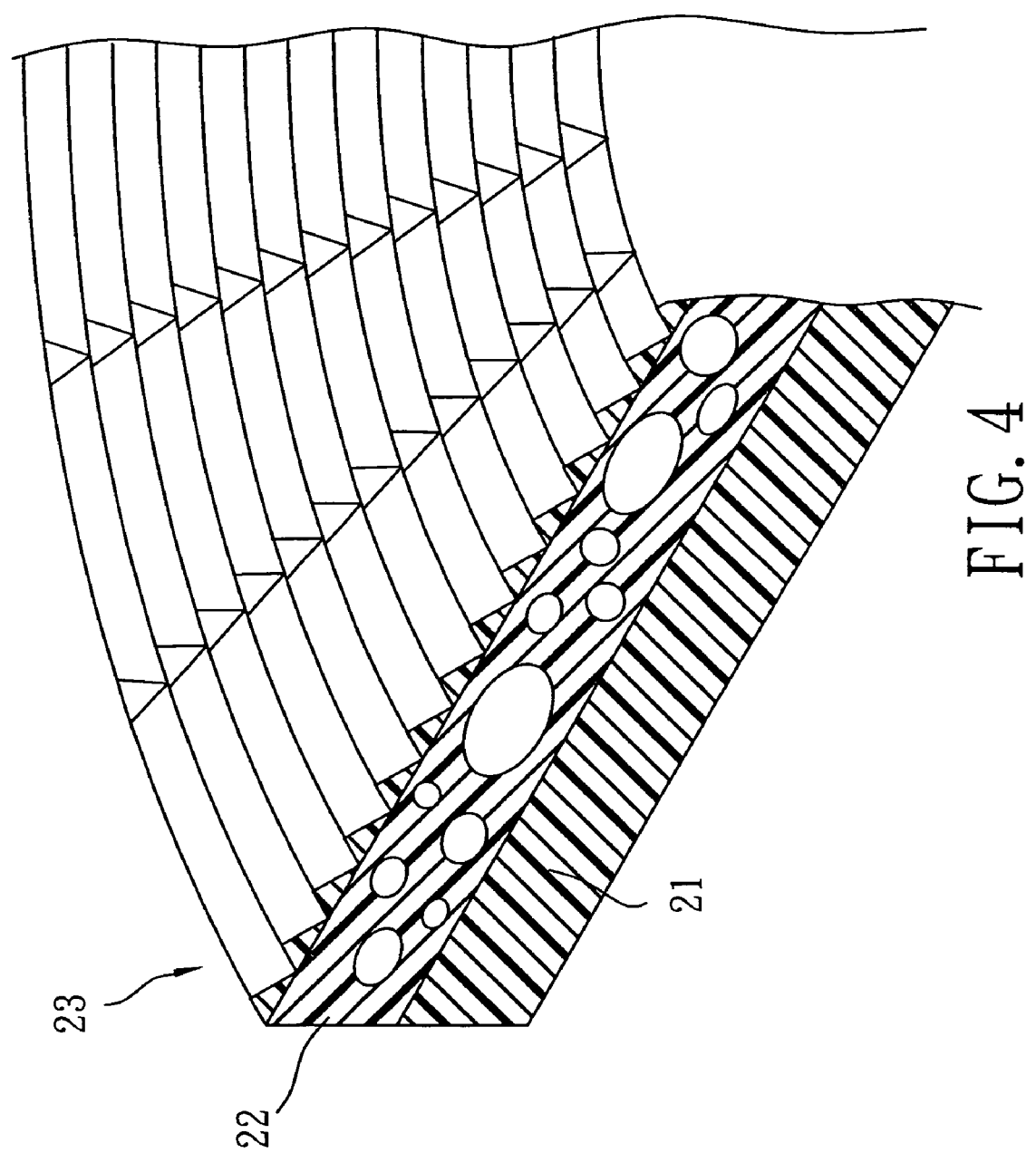
Figure 5:
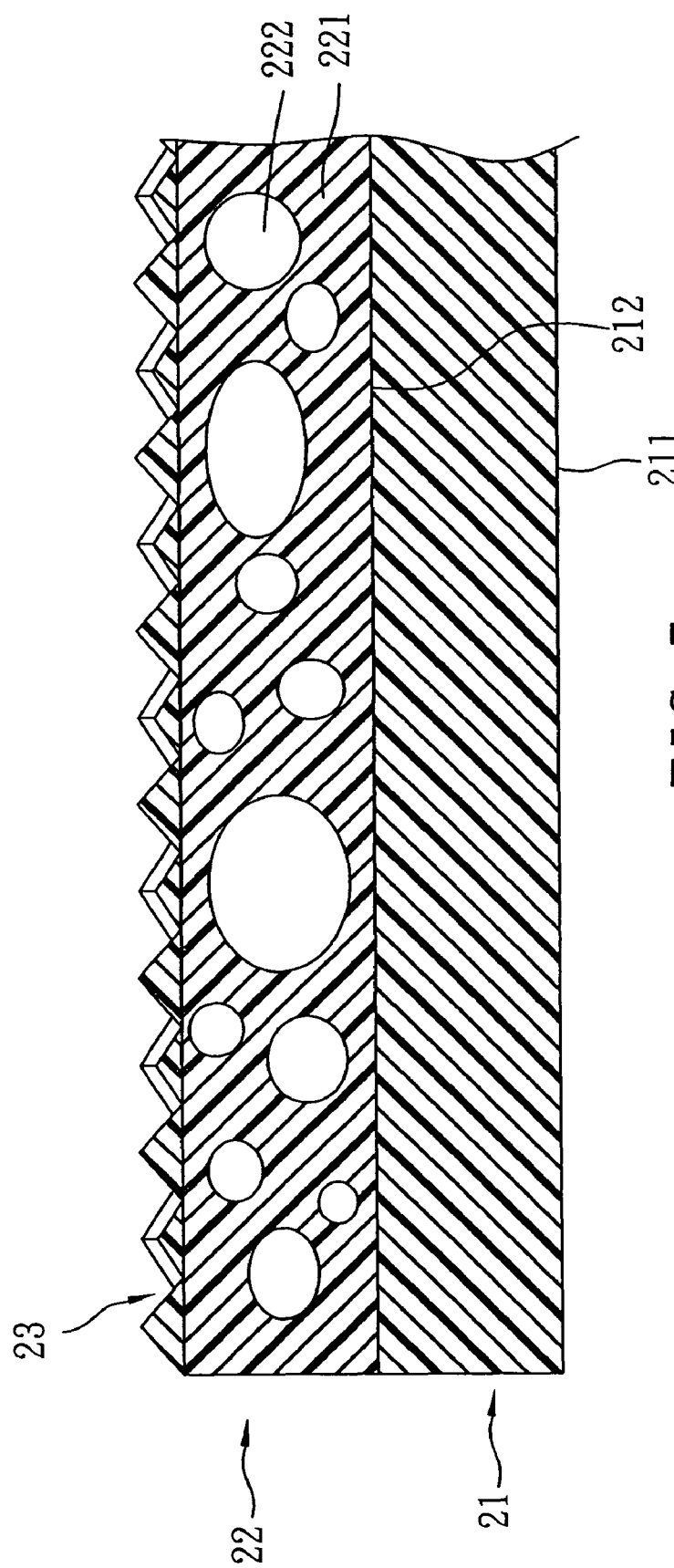
Figure 6:
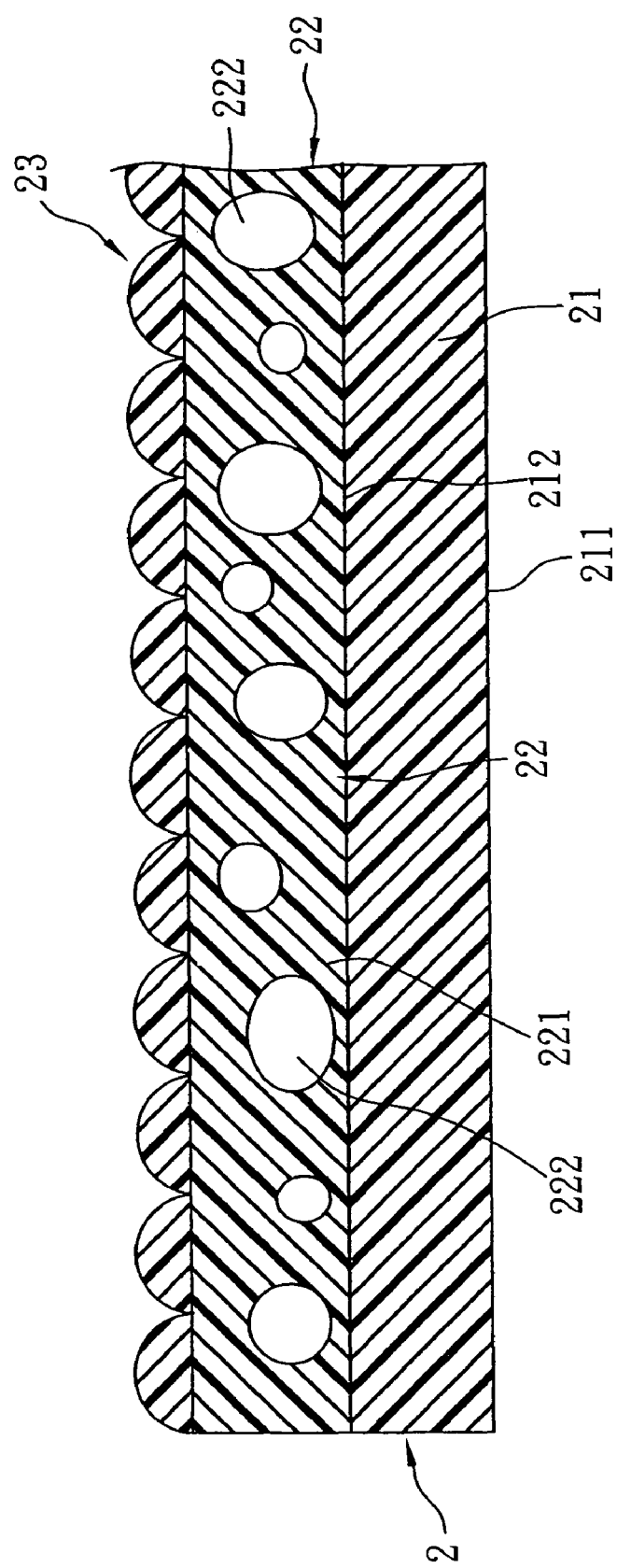

Referring to FIG. 2, the preferred embodiment of an optical sheet 2 according to the present invention includes a substrate 21 having a light-incidence face 211 and a light-emergence face 212 opposite to the light-incidence face 211, an light diffusion layer 22 formed on the light-emergence face 212 of the substrate 21, and a light gathering layer 23 formed on the light diffusion layer 22. The light diffusion layer 22 includes a polymeric resin 221 having a plurality of bubbles 222 mixed in the polymeric resin 221 for scattering a light beam passing through the polymeric resin 221.

The thickness of the substrate 21 is determined according to the requirement for a desired optical product to be manufactured. Preferably, the substrate 21 has a thickness ranging from 50 μm to 150 μm. In addition, the substrate 21 may be made from any suitable material known in art, such as glass and a plastic material. Non-limiting examples of the plastic material suitable for making the substrate 21 include polyester resin, such as polyethylene terephthalate (PET) resin, polyacrylate resin, such as polymethyl methacrylate (PMMA) resin, polyolefin resin, such as polyethylene (PE) resin and polypropylene (PP) resin, polyimide resin, polycarbonate resin, polyurethane (PU) resin, triacetate cellulose, and mixtures thereof. Preferably, the substrate 21 is made from the plastic material selected from the group consisting of polyethylene terephthalate (PET) resin, polymethyl methacrylate (PMMA) resin, triacetate cellulose, and mixtures thereof.

The light diffusion layer 22, which includes the polymeric resin 221 having the bubbles 222 mixed therein, is formed on the substrate 21 through application of a composition including the polymeric resin 221 and a blowing agent to the substrate 21. The polymeric resin suitable for use in the composition for forming the light diffusion layer 22 may include a thermosetting resin or an ultraviolet (UV) curable resin. Preferably, the polymeric resin is an acrylic UV curable resin. Non-limiting examples of the acrylic UV curable resin include methacrylate resin, urethane acrylate resin, polyester acrylate, epoxy acrylate, and mixtures thereof. Preferably, the acrylic UV curable resin is methacrylate resin. In addition, the acrylic UV curable resin may have one or more functional groups. Preferably, the acrylic UV curable resin has multiple functional groups.

The blowing agent used in the composition for forming the light diffusion layer 22 can produce an inert gas through heating or UV-irradiating, which results in formation of the bubbles 222 mixed in the polymeric resin 221. The bubbles 222 may have sizes different from each other. A non-limiting example of the blowing agent is sodium carbonate ($Na_2CO_3$).

In the formation of the light diffusion layer 22 of this invention, when the initiating process (such as heating or UV-irradiating) of foaming the polymeric resin 221 with the blowing agent is the same as that of curing the resin, foaming of the polymeric resin 221 with the blowing agent can be conducted concurrently with curing of the resin. On the other hand, when foaming of the polymeric resin 221 with the blowing agent and curing of the polymeric resin 221 are initiated by different processes, for example, the former being initiated by heating, the latter being initiated by UV-irradiating, foaming of the polymeric resin 221 with the blowing agent is conducted first, followed by curing of the polymeric resin 221.

Figure 7:
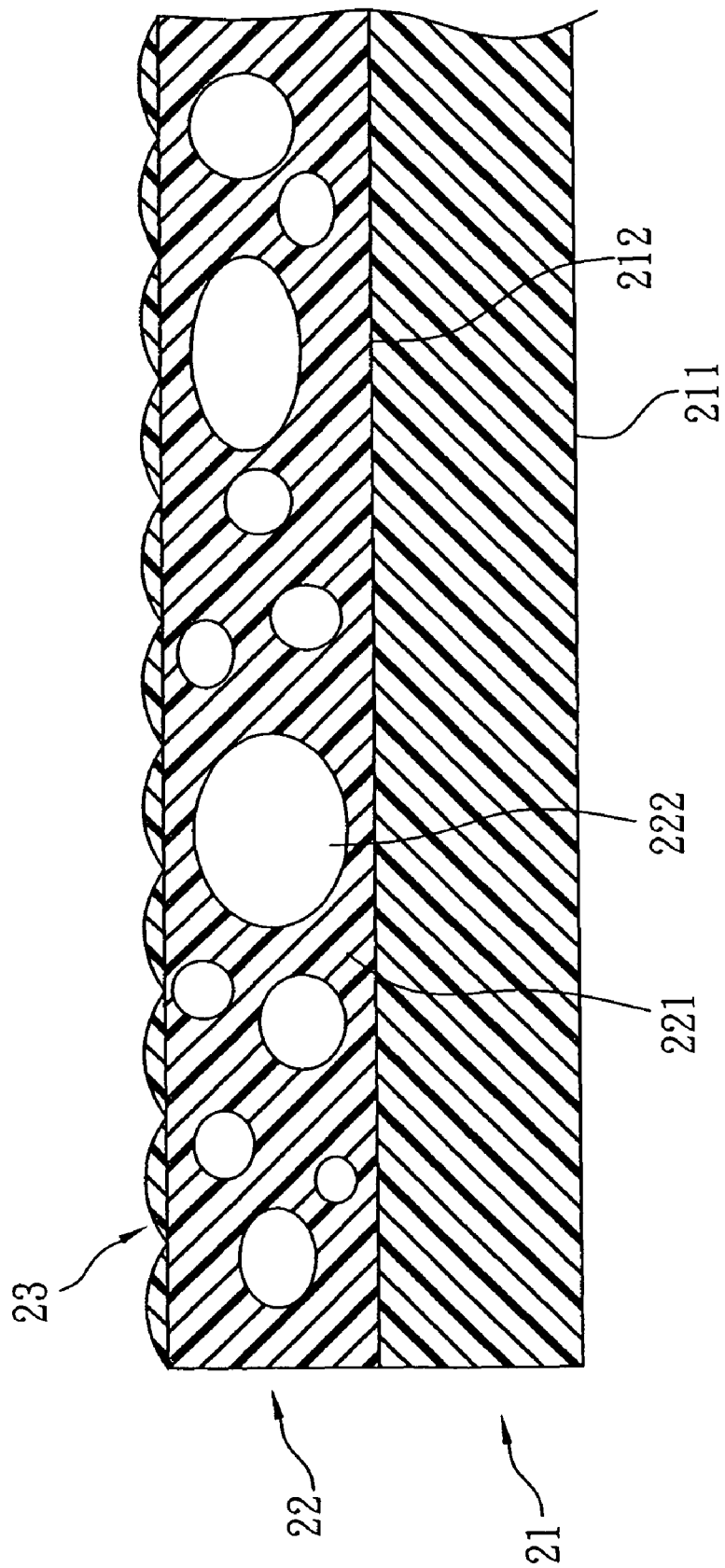

Referring to FIGS. 2 to 6, the light gathering layer 23 has at least one microstructure. Preferably, the microstructure of the light gathering layer 23 is selected from the group consisting of a regular prismatic pattern (see FIG. 2), an irregular prismatic pattern (see FIG. 3), an annular prismatic pattern (See FIG. 4), a cube-corner pattern (See FIG. 5), a bead-like pattern (See FIG. 6), and a lens-like pattern (See FIG. 7) so as to enhance brightness of light through the optical sheet 2. More preferably, the microstructure of the light gathering layer 23 is a regular prismatic pattern shown in FIG. 2 or a bead-like pattern shown in FIG. 3.

The light gathering layer 23 is formed on the light diffusion layer 22 by applying a composition including a resin, a photoinitiator, and a cross-linking agent to the light diffusion layer 22. Preferably, the light gathering layer 23 has a thickness ranging from 5 µm to 100 µm, and a refractive index ranging from 1.3 to 1.8. The resin used in the composition for forming the light gathering layer 23 can be any suitable material known in art. Non-limiting examples of the resin include polyester resin, polyacrylate resin, polycarbonate resin, and mixtures thereof. The photoinitiator used in the composition for forming the light gathering layer 23 can be any suitable material known in art, which is capable of producing free radicals when irradiated, and initiating polymerization through transfer of the free radicals. A non-limiting example of the photoinitiator is benzophenone. The cross-linking agent used in the composition for forming the light gathering layer 23 can be any suitable material known in art. Non-limiting examples of the cross-linking agent include methacylate resin having one or more functional groups. Preferably, the cross-linking agent is multi-functional methacrylate resin capable of raising the glass transition temperature of the light gathering layer 23. In addition, the composition for forming the light gathering layer 23 may further include other additives, such as inorganic fillers, a leveling agent, an anti-foaming agent, and an anti-static agent.

EXAMPLE AND COMPARATIVE EXAMPLES

Preparation of a First Colloidal Solution for Forming the Light Diffusion Layer 22

50% by weight of 2-phenoxyethyl acrylate (commercially available from Eternal Co., R.O.C., trademark: EM210®) was mixed with 50% by weight of aliphatic polyurethane hexapropionate (commercially available from Eternal Co., R.O.C., trademark: 6145-100®) so as to form a polymeric resin matrix. 0.5% by weight of sodium carbonate ($Na_2CO_3$, commercially available from Merck Co., U.S.A.), based on 100% by weight of the polymeric resin matrix, was added to the polymeric resin matrix with stirring so as to form the first colloidal solution for the light diffusion layer 22.

Preparation of a Second Colloidal Solution for Forming the Light Gathering Layer 23

50% by weight of 2-phenoxyethyl acrylate (commercially available from Eternal Co., R.O.C., trademark: EM210®) was mixed with 49% by weight of aliphatic polyurethane hexapropionate (commercially available from Eternal Co., R.O.C., trademark: 6145-100®), and 1% by weight of benzophenone (photoinitiator, commercially available from Double Bond, trademark: Chivacure®) with stirring so as to form the second colloidal solution for the light gathering layer 23.

Comparative Example 1

Optical Sheet Includes the Light Diffusion Layer 22 on a Transparent Substrate 21

The first colloidal solution thus obtained was applied to the transparent substrate 21 made from PET resin (commercially available from Toray company, Japan, trade name: U34®), followed by air-drying the transparent substrate 21 in an oven at a temperature of 100° C. for 20 minutes so as to permit foaming to take place in the applied first colloidal solution. Next, the transparent substrate 21 was moved out of the oven, followed by irradiating with energy rays so as to form the light diffusion layer 22 on the transparent substrate 21. The energy ray refers to a light source with a wavelength ranging from 200 to 600 nm. Preferably, the energy ray is an ultraviolet ray. The light diffusion layer 22 thus formed includes a plurality of bubbles 222 mixed in the polymeric resin matrix of the light diffusion layer 22 and that have an irregular distribution of volumes.

Comparative Example 2

Optical Sheet Includes the Light Gathering Layer 23 on a Transparent Substrate 21

The second colloidal solution thus formed was applied to the transparent substrate 21 made from PET resin (commercially available from Toray company, Japan, trade name: U34®). A mold with a pattern was pressed to the applied second colloidal solution so as to transfer-print the pattern from the mold to the applied second colloidal solution, followed by curing the applied second colloidal solution on the transparent substrate 21 using UV-irradiation. The mold was then removed so as to obtain the optical sheet.

Example 1

The first colloidal solution thus formed was applied to a transparent substrate 21 made from PET resin (commercially available from Toray company, Japan, trade name: U34®), followed by air-drying the transparent substrate 21 in an oven at a temperature of 100° C. for 20 minutes so as to permit foaming to take place in the applied first colloidal solution. Next, the transparent substrate 21 was moved out of the oven, followed by irradiating with UV rays so as to form the light diffusion layer 22 on the transparent substrate 21. The light diffusion layer 22 thus formed includes a plurality of bubbles 222 that are mixed in the polymeric resin matrix of the light diffusion layer 22 and that have irregular sizes.

The second colloidal solution thus formed was subsequently applied to the light diffusion layer 22. A mold with a pattern was pressed to the applied second colloidal solution so as to transfer-print the pattern from the mold to the applied second colloidal solution, followed by curing the applied second colloidal solution using UV-irradiation. The mold was then removed so as to obtain the optical sheet 2.

Haze and diffusivity of the transparent substrate, the optical sheet of comparative example 1, the optical sheet of comparative example 2, and the optical sheet of example 1 were tested using NDH 2000 instrument (commercially available from NIPPON DENSHOKU Co., Japan). The test results are shown in Table 1.

TABLE 1

| Specimen | Haze | Diffusivity (Dfs) |
| --- | --- | --- |
| The transparent substrate | 0.5 | 0.5 |
| The optical sheet of comparative example 1 | 25 | 20 |
| The optical sheet of comparative example 2 | 94 | 5 |
| The optical sheet of example 1 | 97 | 25 |

In view of the foregoing, the optical sheet 2 of this invention not only has a distinctive structure over the conventional optical sheet but also provides improved light-collimating and light-scattering effects.

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. An optical sheet, comprising:
   a plastic substrate;
   a light diffusion layer formed on said substrate, and comprising a UV curable resin having bubbles mixed therein; and
   a light gathering layer formed on said light diffusion layer by applying a composition on said light diffusion layer, said light gathering layer having at least one microstructure, that is selected from a group consisting of a regular prismatic pattern, an irregular prismatic pattern, an annular prismatic pattern, and a cube corner pattern,
   wherein the UV curable resin is an acrylic UV curable resin selected from the group consisting of methacrylate resin, urethane acrylate resin, polyester acrylate resin, and mixtures thereof, and wherein said composition is made from polyacrylate resin,
   and wherein the bubbles have an irregular distribution of volumes within the light diffusion layer.

2. The optical sheet of claim 1, wherein the microstructure is the regular prismatic pattern.

3. The optical sheet of claim 1, wherein said plastic substrate is selected from the group consisting of polyethylene terephthalate (PET) resin, polymethyl methacrylate (PMMA) resin, polyethylene (PE) resin, polypropylene (PP) resin, polyimide resin, polycarbonate resin, polyurethane (PU) resin, and mixtures thereof.

4. The optical sheet of claim 3, wherein said plastic substrate is selected from the group consisting of polyethylene terephthalate (PET) resin, polymethyl methacrylate (PMMA) resin, and mixtures thereof.

5. The optical sheet of claim 1, wherein said UV curable resin includes a blowing agent which when activated foams the UV curable resin to form the bubbles.

6. The optical sheet of claim 5, wherein said blowing agent is activated by heat or UV-irradiating.

7. The optical sheet of claim 1, wherein said composition includes a photoinitiator and a cross-linking agent.

8. The optical sheet of claim 1, wherein said composition is applied to said light diffusion layer in an uncured form.

9. The optical sheet of claim 8, wherein said at least one microstructure is molded onto said uncured composition during a curing process.

10. The optical sheet of claim 1, wherein said at least one light gathering layer is directly touching said light diffusion layer.

11. The optical sheet of claim 1, wherein the microstructure is the annular prismatic pattern.

* * * * *